(12) United States Patent
Brown

(10) Patent No.: US 7,996,485 B2
(45) Date of Patent: *Aug. 9, 2011

(54) METHOD AND APPARATUS FOR REDUCING POOL STARVATION IN A SHARED MEMORY SWITCH

(75) Inventor: David Brown, Carp (CA)

(73) Assignee: MOSAID Technologies Incorporated, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/775,696

(22) Filed: May 7, 2010

(65) Prior Publication Data

US 2010/0250699 A1    Sep. 30, 2010

Related U.S. Application Data

(60) Continuation of application No. 12/139,007, filed on Jun. 13, 2008, now Pat. No. 7,743,108, which is a division of application No. 11/323,814, filed on Dec. 29, 2005, now Pat. No. 7,403,976, which is a continuation of application No. 09/624,276, filed on Jul. 24, 2000, now Pat. No. 7,007,071.

(51) Int. Cl.
    *G06F 15/167*    (2006.01)
(52) U.S. Cl. ..... 709/213; 709/215; 709/224; 370/395.7; 370/413
(58) Field of Classification Search .......... 709/213–215, 709/223–224, 238, 232, 234; 370/395.7, 370/413
See application file for complete search history.

(56) References Cited

U.S. PATENT DOCUMENTS

| 5,315,586 | A |   | 5/1994  | Charvillat |
|-----------|---|---|---------|------------|
| 5,838,994 | A |   | 11/1998 | Valizadeh  |
| 5,991,295 | A | * | 11/1999 | Tout et al. ................. 370/395.7 |
| 6,021,132 | A | * | 2/2000  | Muller et al. ................. 370/412 |
| 6,046,982 | A |   | 4/2000  | Ozveren et al. |
| 6,049,546 | A |   | 4/2000  | Ramakrishnan |

(Continued)

FOREIGN PATENT DOCUMENTS

WO          9703549          4/1997

OTHER PUBLICATIONS

Yang, L., et al., "Optimizing Primary Data Caches for Parallel Scientific Applications: The Pool Buffer Approach", Proceedings of the 1996 International Conference on Supercomputing, Philadelphia, PA (May 1996).

*Primary Examiner* — Philip B Tran
(74) *Attorney, Agent, or Firm* — Daniel A. Hammond

(57) ABSTRACT

A switch includes a reserved pool of buffers in a shared memory. The reserved pool of buffers is reserved for exclusive use by an egress port. The switch includes pool select logic which selects a free buffer from the reserved pool for storing data received from an ingress port to be forwarded to the egress port. The shared memory also includes a shared pool of buffers. The shared pool of buffers is shared by a plurality of egress ports. The pool select logic selects a free buffer in the shared pool upon detecting no free buffer in the reserved pool. The shared memory may also include a multicast pool of buffers. The multicast pool of buffers is shared by a plurality of egress ports. The pool select logic selects a free buffer in the multicast pool upon detecting an IP Multicast data packet received from an ingress port.

8 Claims, 6 Drawing Sheets

U.S. PATENT DOCUMENTS

| | | |
|---|---|---|
| 6,147,969 A | 11/2000 | Benmohamed et al. |
| 6,151,301 A | 11/2000 | Holden |
| 6,216,167 B1 | 4/2001 | Momirov |
| 6,219,728 B1 | 4/2001 | Yin |
| 6,320,861 B1 | 11/2001 | Adam et al. |
| 6,456,590 B1 * | 9/2002 | Ren et al. ............... 370/229 |
| 6,484,209 B1 | 11/2002 | Momirov |
| 6,487,202 B1 | 11/2002 | Klausmeier et al. |
| 6,501,757 B1 | 12/2002 | Kamaraj et al. |
| 6,523,060 B1 | 2/2003 | Kao |
| 6,535,516 B1 | 3/2003 | Leu et al. |
| 6,535,963 B1 | 3/2003 | Rivers |
| 6,625,159 B1 * | 9/2003 | Singh et al. ............... 370/413 |
| 6,657,962 B1 | 12/2003 | Barri et al. |
| 6,920,146 B1 | 7/2005 | Johnson et al. |
| 7,145,868 B2 | 12/2006 | Giroux et al. |
| 7,743,108 B2 * | 6/2010 | Brown ............... 709/213 |

* cited by examiner

METHOD AND APPARATUS FOR REDUCING POOL STARVATION IN A SHARED MEMORY SWITCH

RELATED APPLICATION(S)

This application is a continuation of U.S. application Ser. No. 12/139,007, filed Jun. 13, 2008 now U.S. Pat. No. 7,743,108 which is a divisional of U.S. application Ser. No. 11/323,814, filed Dec. 29, 2005 now U.S. Pat. No. 7,403,976, which is a continuation of U.S. application Ser. No. 09/624,276, filed Jul. 24, 2000 now U.S. Pat. No. 7,007,071. The entire contents of the above applications are incorporated herein by reference in their entireties.

BACKGROUND OF THE INVENTION

A networking switch receives data packets at ingress ports and forwards the data packets to one or more egress ports. The switch determines the egress port or ports to which the data packets are forwarded dependent on a destination address included in the data packet. A data packet received from an ingress port is stored in memory in the switch before being forwarded.

The memory in the switch may be a shared memory in which all received data packets are stored before being forwarded. As the received data is stored in the shared memory, a data packet pointer; that is, a pointer to the location of the received data in shared memory is stored in one or more queues. The data packet pointer may be queued dependent on the ingress port at which it was received or the egress port at which it is to be transmitted. An output buffered switch queues a data packet pointer dependent on the egress port at which it is to be transmitted.

The shared memory is shared by all the egress ports and a location is randomly allocated to an egress port for storing a received data packet to be forwarded to the egress port. The number of data packets transmitted through each egress port can vary dramatically resulting in temporary congestion in a particular egress port. Temporary congestion may occur at an egress port if data packets received from a plurality of ingress ports are to be forwarded through the same egress port or if there is a speed mismatch between the ingress port and the egress port, for example, the ingress port receives data at 1 Gigabits per second and the egress port transmits data at 100 Megabits per second.

SUMMARY OF THE INVENTION

A shared memory provides more memory for use by a congested egress port but all the shared memory may be consumed storing data for a congested egress port leaving no memory available for storing data to be forwarded to non-congested egress ports. This results in data packets being dropped for non-congested egress ports.

In accordance with the invention, a shared memory switch including a reserved pool of buffers in the shared memory is presented. The reserved pool of buffers is reserved for an egress port. The switch includes pool select logic which selects a free buffer from the reserved pool for storing data received from an ingress port to be forwarded to the egress port.

The shared memory also includes a shared pool of buffers. The shared pool of buffers is shared by a plurality of egress ports. Upon detecting no free buffer in the reserved pool, the pool select logic selects a free buffer in the shared pool.

The shared memory may also include a multicast pool of buffers. The multicast pool of buffers is shared by a plurality of egress ports. The pool select logic selects a free buffer in the multicast pool upon detecting an IP Multicast data packet received from an ingress port.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
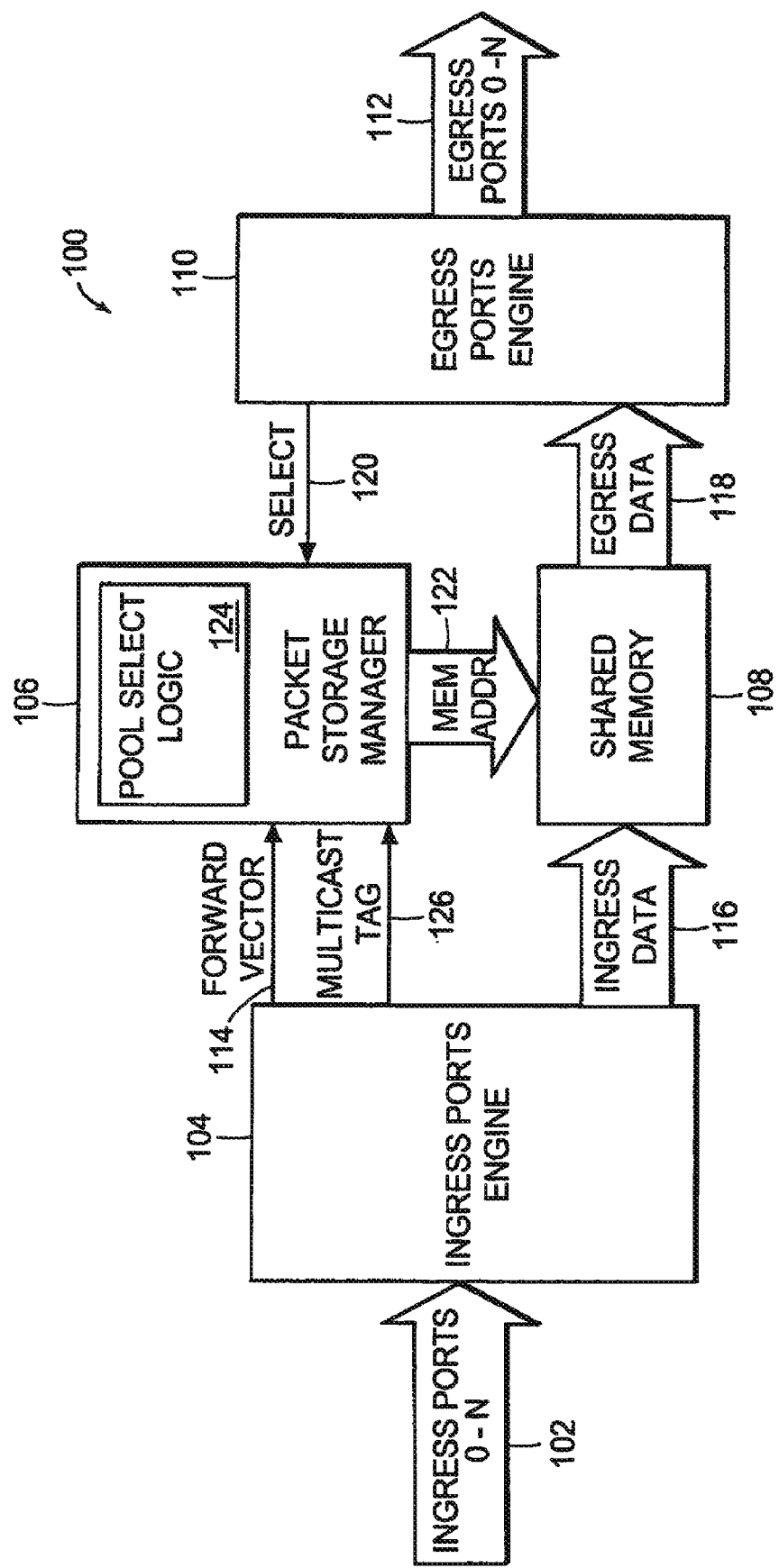
FIG. 1 is a block diagram of a shared memory switch.
Figure 2:
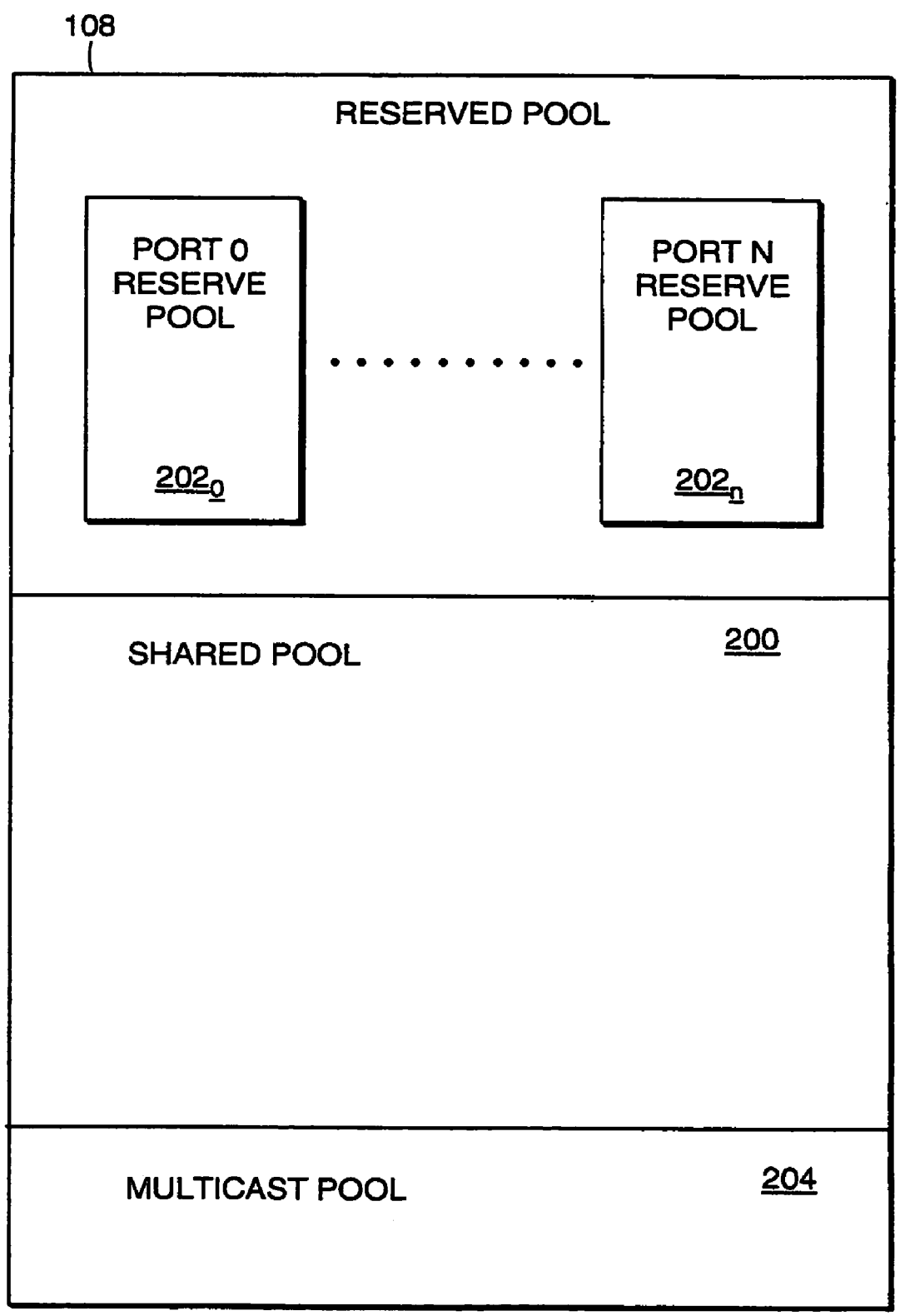
FIG. 2 is a block diagram of the shared memory shown in FIG. 1 illustrating the reserved pools, shared pool and multicast pool.

FIG. 1 is a block diagram of a shared memory switch 100. All data received on ingress ports 102 is stored in shared memory 108 before being forwarded to one or more egress ports $112_{0-n}$. The packet storage manager 106 controls write and read access to the shared memory 108. The packet storage manager 106 includes pool select logic 124. The pool select logic 124 logically portions the shared memory 108 into a shared pool, a multicast pool and a plurality of reserved pools as illustrated in FIG. 2. There is no actual physical portioning of the shared memory 108.

The pool select logic 124 manages the buffers in each pool by selecting a pool from which to allocate a buffer. A buffer is allocated from the egress port's reserved pool if the number of allocated buffers for an egress port 112 is less than a reserved threshold count. The pool select logic 124 is described later in conjunction with FIG. 2. Read and write access to the shared memory 108 is described in co-pending U.S. patent application Ser. No. 09/386,589 filed on Aug. 31, 1999 entitled "Method and Apparatus for an Interleaved Non-Blocking Packet Buffer" by David A. Brown which is incorporated herein by reference in its entirety.

The switch 100 includes an ingress ports engine 104 and an egress ports engine 110. A data packet is received serially at an ingress port 102. The ingress engine 104 detects and processes headers in the received data packet, determines from the detected header on which egress port $112_{0-n}$ to forward the data packet and generates a forward vector 114 for the data packet. The forward vector 114 is a bit map, with a bit corresponding to each of the plurality of egress ports $112_{0-n}$, indicating whether the data packet is to be forwarded to that egress port $112_{0-n}$. A method and apparatus for generating a forward vector 114 is described in co-pending U.S. patent application Ser. No. 09/453,344 filed Dec. 1, 1999 entitled "Method and Apparatus for Wire-Speed IP Multicast Forwarding" by David A. Brown, the entire teachings of which are incorporated herein by reference in its entirety. The forward vector 114 is forwarded to the packet storage manager 106.

The packet storage manager 106 provides shared memory addresses 122 for read and write operations to the shared memory 108 and stores the locations in the shared memory 108 of each data packet stored in one or more egress port queues (not shown). A method and apparatus for providing egress port queues is described in co-pending U.S. patent application Ser. No. 09/559,190 filed on Apr. 27, 2000 entitled "Port Packet Queuing" by Richard M. Wyatt incorporated herein by reference in its entirety. The egress engine 110 through select 120 selects one of the plurality of egress ports $112_{0-n}$, on which to transmit a data packet and provides the stored data packet to the selected egress port $112_{0-n}$.

The shared memory 108 stores data packets received from any of the ingress ports 102 for transmitting to any of the egress ports $112_{0-n}$. The switch 100 provides concurrent processing by the ingress port engine 104 of data packets received at ingress ports 102 and processing of stored data packets by the egress port engine 110 for forwarding on egress ports $112_{0-n}$.

As a data packet is received serially on one of the ingress ports 102, the serial data may be grouped into data segments. Each data segment is stored in a buffer in shared memory 108. Thus, the size of a buffer is dependent on the size of a data segment. The size of a data segment is dependent on the networking protocol supported by the switch 100. For example, for the Ethernet networking protocol, the size selected for the data segment is 64 bytes because the minimum data packet size for an Ethernet data packet is 64 bytes.

The ingress ports engine 104 also determines from the header included in a received data packet if a data packet is an IP Multicast data packet. The switch 100 forwards a copy of an IP Multicast data packet to each member of the IP Multicast group. A single copy of the data packet is stored in shared memory 108 with a Multicast Forwarding Index ("MFI") as is described in co-pending U.S. patent application Ser. No. 09/453,344 filed Dec. 1, 1999 entitled "Method and Apparatus for Wire-Speed IP Multicast Forwarding" by David A. Brown, which is incorporated herein by reference in its entirety. Members of the IP Multicast group may be connected to the same egress port 112 or to more than one egress port 112. Multiple copies of the IP Multicast data packet are forwarded to an egress port 112, one for each member of the IP Multicast group connected to the egress port 112. If the received data packet is an IP Multicast data packet, the ingress ports engine 104 forwards a multicast tag 126 with the forward vector 114 indicating that the received data packet is an IP Multicast data packet. The multicast tag 126 indicates whether the received data packet is an IP Multicast data packet. The multicast tag 126 can be implemented as a single bit set to '1' if the received data packet is an IP Multicast data packet.

FIG. 2 is a block diagram of the shared memory 108 shown in FIG. 1 logically portioned into a shared pool 200, a Multicast pool 204 and a plurality of reserved pools $202_0\text{-}202_n$. A reserved pool $202_0\text{-}202_n$ is provided for each egress port $112_{0-n}$. A reserved threshold count of buffers is assigned to each reserved pool $202_0\text{-}202_n$. The reserved threshold count of buffers may only be allocated for storing data packets for the respective egress port 112. The shared pool 200 is provided for storing data packets to be forwarded to any of the egress ports $112_{0-n}$. The Multicast pool 204 is provided for storing IP Multicast data packets to be forwarded to any of the egress ports 114.

A buffer is allocated from the egress ports reserved pool $202_{0-n}$ while the count of allocated buffers is below the threshold count. If the number of reserved allocatable buffers has been exceeded, buffers are allocated from the shared pool 200. A buffer for a data packet can only be allocated from the respective reserved pool $202_0\text{-}202_n$ associated with the egress port $112_{0-n}$. Thus, even if all the buffers in the shared pool 200 are allocated to one congested egress port $112_{0-n}$, a buffer is available for allocation to a non-congested port from the non-congested port's respective reserve pool $202_0\text{-}202_n$.

If the data packet is an IP Multicast data packet, the data packet is stored once in shared memory 108 and a copy of the stored data packet is forwarded to members of the IP Multicast group. The IP Multicast data packet is stored in shared memory 108 until the IP Multicast data packet has been forwarded to each member of the IP Multicast group.

As the stored IP Multicast data packet may be forwarded to more than one egress port 112, it is difficult to select a port reserved pool 202 from which to allocate a buffer in which to store the IP Multicast data packet. Also, without keeping separate accounting for IP Multicast data packets, it cannot be determined when an IP Multicast data packet is being dequeued whether it is from a reserved pool 202 or a shared pool 200 because the buffer may not have been allocated from the reserved pool for the egress port to which the last IP Multicast data packet is forwarded. Having a separate pool for storing IP Multicast data packets allows a switch 100 to limit the number of buffer resources that can be consumed for storing IP Multicast data packets. Thus, a Multicast pool 204 is provided to store IP Multicast data packets.

Figure 3:
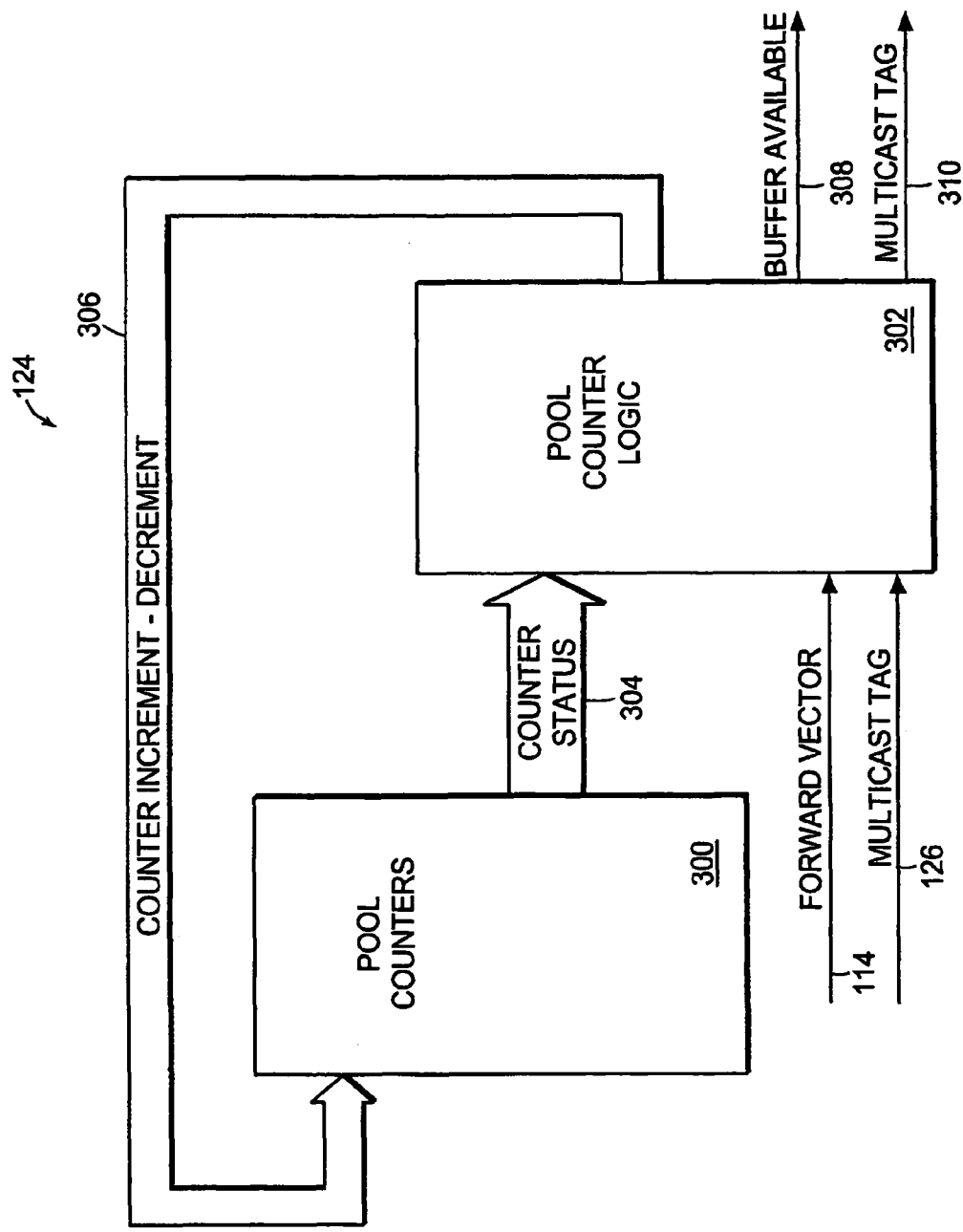
FIG. 3 is a block diagram of the pool select logic in the packet storage manager shown in FIG. 1.

FIG. 3 is a block diagram of the pool select logic 124 in the packet storage manager 106 shown in FIG. 1. The pool select logic 124 includes pool counters 300 and pool counter logic 302. The pool counters 300 include a counter for each pool 200, $202_0\text{-}202_n$, 204 in shared memory 108. The counter status 304 is forwarded to the pool counter logic 302.

The pool counter logic 302 selects the pool 200, $202_0\text{-}202_n$ or 204 from which to allocate a buffer dependent on the state of counter status 304, the forward vector 114 and the Multicast tag 126 for the received data packet to be stored in shared memory 108. After selecting the pool 200, $202_0\text{-}202_n$ or 204, the pool counter logic 302 generates counter increment-decrement 306 to increment or decrement the respective counter in pool counters 300. The pool counter logic 302 also generates buffer_available 308. The state of buffer_available 308 indicates whether a buffer is available for storing a received non-Multicast data packet in shared memory 108. If no buffer is available for a non-Multicast data packet in the shared pool 200 or the port reserved pool 202, or for a Multicast data packet in the Multicast pool 204, the received data packet is dropped.

If a buffer is available in which to store the received data to be forwarded to an egress port, a buffer is allocated from a free list of buffers in shared memory 108 as described in conjunction with co-pending U.S. patent application Ser. No. 09/386,589 filed on Aug. 31, 1999 entitled "Method and Apparatus for an Interleaved Non-Blocking Packet Buffer" by David A. Brown which is incorporated herein by reference in its entirety.

Figure 4:
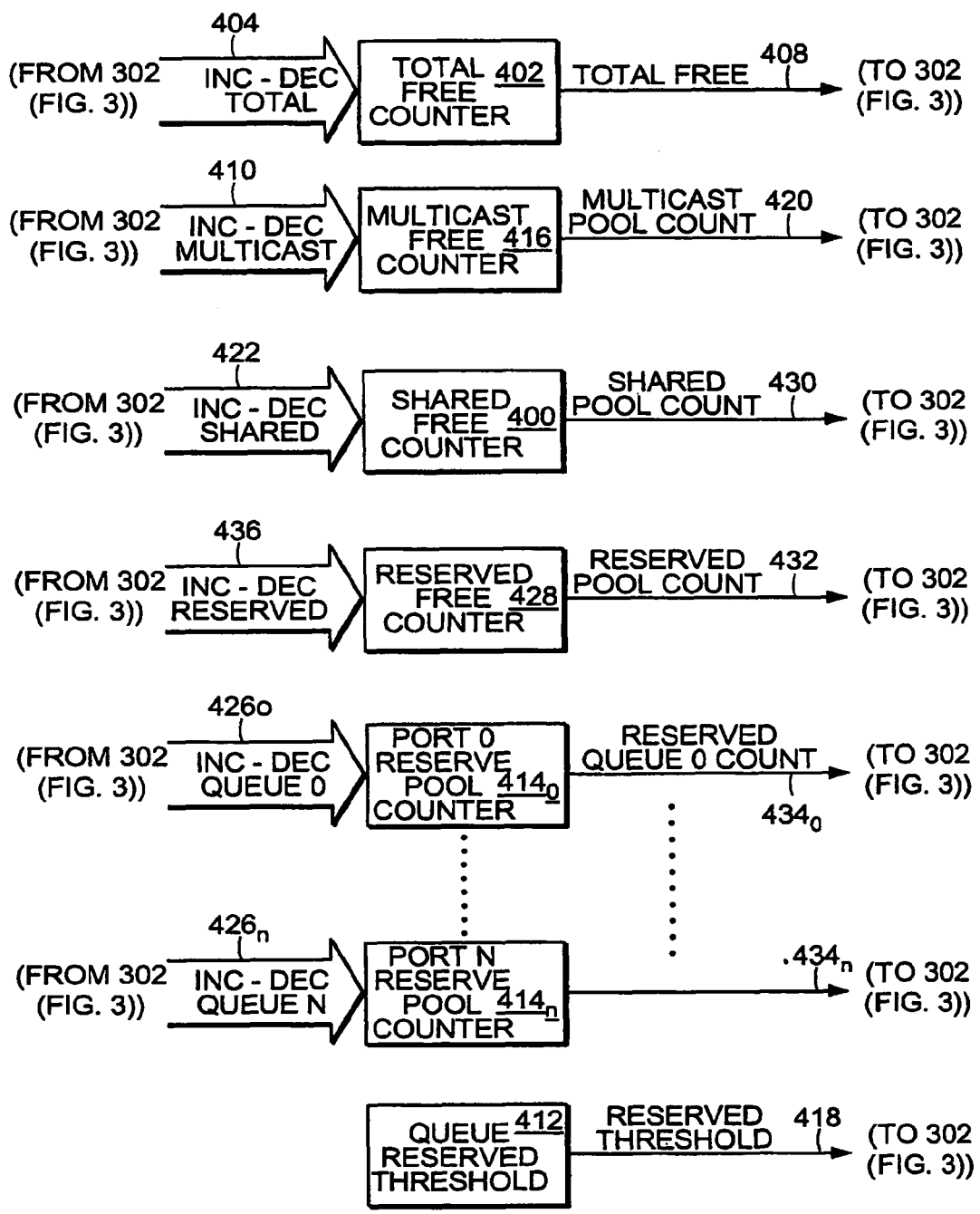
FIG. 4 is a block diagram of the pool counters shown in FIG. 3.

FIG. 4 is a block diagram of the pool counters 300 shown in FIG. 3. The pool counters 300 include a shared free counter 400, a total free counter 402, a Multicast free counter 416, a reserved free counter 428, a queue reserved threshold register 412, and a port reserve pool counter $414_{0-n}$ for each egress port $112_{0-n}$ in the switch 100.

The total free counter 402 stores the total number of free buffers in shared memory 108. The total free counter 402 is preset with the sum of the buffers in the shared pool 200, the port reserve pools $202_0$-$202_n$ and the Multicast pool 204. The total free counter 402 is decremented each time a buffer is allocated from any pool to store a data packet. If the pools are assigned as follows: reserved=500; shared=2000; Multicast=500, the sum of the buffers is 3000 equal to the total number of available buffers. IP Multicast data packets are dropped once the 500 data packets in the Multicast pool 204 are used even if there are buffers available in the shared pool 200.

There is a certain amount of "tuning" required in a switch. The tuning includes determining how to divide the shared memory 108 to reduce the probability of dropping data packets during congestion. Most congestion occurs when there are bursts of data colliding together at an output port. Depending on factors such as burst length and others, the drop probability varies dependent on the over subscription ratios of the pools in shared memory 108. Thus, the thresholds for the pools in shared memory 108 are modifiable dependent on expected load conditions.

In an alternative embodiment, the pools 200, $202_0$-$202_n$, and 204 are oversubscribed. The total free counter 402 is initialized with the total number of physical buffers in shared memory 108. The sum of the buffers in the shared pool 200, the port reserve pools $202_0$-$200_n$ and the Multicast pool 204 is greater than the count stored in the total free counter 402. This allows for better utilization of buffers in shared memory 108, but reduces the guarantee that there will be a buffer available in the port reserve pool 202.

For example, if the pools are assigned as follows: reserved pool=1000; shared pool=2000; Multicast pool=1000, the sum of the buffers is 4000 but the total number of available buffers in shared memory 108 is 3000; that is, less than the sum of the buffers in the pools. This allows better utilization of the buffers in shared memory 108 if there is more Multicast data traffic than unicast and broadcast data traffic through the switch 100 because one third of the total number of available buffers may be allocated for storing IP Multicast data packets.

If the Multicast pool 204 is not oversubscribed, Multicast data packets are dropped when the Multicast pool 204 is full even if there are buffers available in shared memory 108. Thus, with over subscription, it is less likely that data packets are dropped when there are buffers available in shared memory 108. The disadvantage is that a buffer may not be available in the reserved pool for a non-congested port even if the respective port reserved pool 202 is below its reserved threshold.

The shared free counter 400 stores the number of available or free buffers in the shared pool 200. Buffers in the shared pool 200 of shared memory 108 may store a data packet for any egress port $112_{0-n}$. The shared free counter 400 is decremented each time a buffer is allocated from the shared pool 200. Shared pool count 430 indicates whether there are free buffers in the shared pool 200. The shared pool count 430 is forwarded to pool counter logic 302.

The Multicast free counter 416 stores the number of available buffers in the Multicast pool 204. The port reserve pool counters $414_{0-n}$ store the number of buffers allocated to the respective egress port 112 from the respective port reserve pool $202_0$-$202_n$ and the shared pool 200. A queue reserved threshold register 412 stores the number of buffers reserved for allocation to a port reserve pool $202_0$-$202_n$. One queue reserved threshold register 412 is provided if the same number of buffers is reserved for allocation to each port reserve pool $202_0$-$202_n$. In an alternative embodiment each port reserve pool $202_0$-$202_n$ may have a different number of buffers reserved for allocation and thus a queue reserved threshold register 412 is required for each port reserve pool counter $414_{0-n}$.

The reserved free counter 428 is preset to the sum of the buffers reserved for each egress port 112 or is preset to a number less than the sum. If the reserved free counter is preset to a number less than the sum, more reserved memory is provided per egress port but an egress port may not be able to allocate all of the buffers in its respective reserved pool. For example, if there are four reserve port pools each with 100 buffers reserved and the total reserved is set to 400. Upon receiving a data packet to forward to an egress port, the packet is dropped if there are no free buffers in the shared pool and the egress port has no free buffers in its respective reserve port pool even if there are free buffers in the reserved pool. If each reserve port pool is oversubscribed to 150, each egress port may use up to 150 buffers of the 400 buffers in the reserved pool. Thus, more buffers are available for a congested port. However, by oversubscribing, an egress port is not guaranteed allocation of its reserved pool of buffers. For example, in a switch with 4 ports and each reserve port pool oversubscribed to 150, with one congested port using 150 buffers, there are 250 buffers available for allocation to the other 3 ports.

Each of the counters 400, 402, $414_{0-n}$, 416, and 428 has a respective counter increment-decrement signals 422, 404, $426_{0-n}$, 410 and 436 generated by the pool counter logic 302 and forwarded on counter increment-decrement 306 (FIG. 3). A counter 400, 402, $414_{0-n}$, 416, and 428 is incremented or decremented each time a buffer is allocated or freed from a respective pool. For example, the shared free counter 400 is decremented each time a buffer is allocated from the shared pool 200 and incremented each time a buffer is freed back to the shared pool 200. The total free counter 402 is decremented each time a buffer is allocated from any pool and incremented each time a buffer is freed to any pool.

Figure 5:
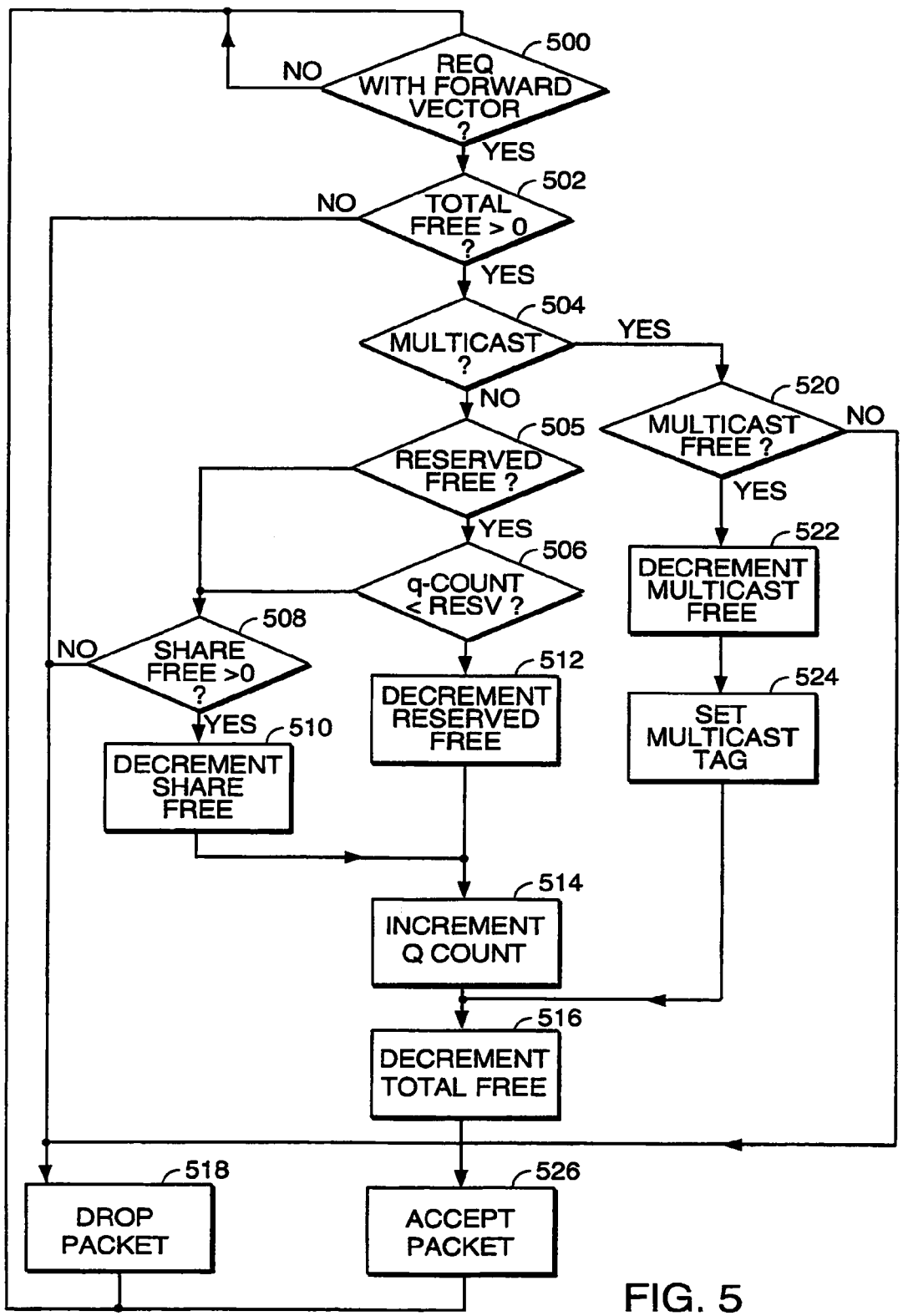
FIG. 5 is a flowchart illustrating the steps for selecting a pool implemented in pool counter logic shown in FIG. 3.

FIG. 5 is a flowchart illustrating the steps for selecting a pool 200, $202_0$-$202_n$, 204 in shared memory 108 from which to allocate a buffer implemented in pool counter logic 302 shown in FIG. 3. FIG. 5 is described in conjunction with FIG. 3 and FIG. 4.

At step 500, the pool counter logic 302 waits for notification of a received data packet to be stored in shared memory 108. The notification of a received data packet includes a forward vector 114 and a multicast tag 126 forwarded from the ingress ports engine 104. The forward vector 114 indicates the egress ports $112_{0-n}$ to which the received data packet is to be forwarded. The Multicast tag 126 indicates whether the data packet is an IP Multicast data packet. If a data packet is received, processing continues with step 502. If not, processing continues with step 500.

At step 502, the pool counter logic 302 determines if there is a buffer available in the shared memory 108 for storing the received data packet. A buffer is available in shared memory 108 if total free 408 is greater than zero. Total free 408 is the count of free buffers stored in the total free counter 402 (FIG. 4). If a buffer is available, processing continues with step 504. If not, processing continues with step 518.

At step 504, the pool counter logic 302 determines if the received data packet is an IP Multicast data packet. The state of the Multicast tag 126 indicates whether the data packet is an IP Multicast data packet. If the data packet is an IP Multicast data packet, the data packet is stored once in shared memory 108 and a copy of the stored data packet is forwarded to each member of the IP Multicast group. The data packet may be forwarded multiple times to one or more egress ports $112_{0-n}$. If the received data packet is an IP Multicast data packet, processing continues with step 520. If not, processing continues with step 505.

At step 505, the received data packet is a non-IP Multicast data packet. Thus, a buffer must be allocated from the shared pool 200 or the port reserve pool $202_0$-$202_n$. The pool counter logic 302 determines if there is a buffer available in any of the port reserve pools $202_0$-$202_n$. A buffer is available if the reserved pool count 432 is greater than zero. The reserved pool count 432 is checked because the reserved pool 202 may be oversubscribed. Thus, even if the queue count $434_{0-n}$ associated with the egress port $112_{0-n}$ to which the received data packet is to be forwarded is less than the reserved threshold 418, there may not be a buffer available in the reserved pools 202. If there is a buffer available, processing continues with step 506. If not, processing continues with step 508.

At step 506, The pool counter logic 302 determines if there is a buffer available in the respective port reserve pool $202_0$-$202_n$. A buffer is available if the queue count $434_{0-n}$ associated with the egress port $112_{0-n}$ to which the received data packet is to be forwarded is less than the reserved threshold 418. If so, processing continues with step 512. If not, processing continues with step 508.

At step 508, no buffers are available in the respective port reserve pool $202_0$-$202_n$ of the shared memory 108. The pool counter logic 302 determines if there is a buffer available in the shared pool 200. A buffer is available if the shared pool count 430 is greater than zero. If so, processing continues with step 510. If not, processing continues with step 518.

At step 510, a buffer is allocated from the shared pool 200. The pool counter logic 302 updates the number of buffers available in the shared pool 200 by decrementing the shared free counter 400 through increment-decrement shared 422. Processing continues with step 514.

At step 512, the pool counter logic 302 updates the number of buffers available in the port reserve pool 202 by decrementing the reserved free counter 428 through increment-decrement reserved 436. Processing continues with step 514.

At step 514, the pool counter logic 302 updates the number of buffers used by the egress port by incrementing the port reserve pool counter 414 through increment-decrement queue 426. The respective port reserve pool counter 414 is selected dependent on the egress port 112 selected in the forward vector 114. A buffer for a respective egress port may be allocated from the shared pool 200 or the respective port reserve pool 202. Thus, the respective reserved queue count 434 may be greater than the reserved threshold 418. Processing continues with step 516.

At step 516, the pool counter logic 302 updates the total number of free buffers in shared memory 108 by decrementing the total free counter 402 through increment-decrement total 404. Processing continues with step 526.

At step 518, there is no buffer available in shared memory 108. The egress port 112 has used all the buffers from the respective port reserve pool 202 and all buffers in the shared pool 200 are in use. The received data packet is dropped. Processing is complete.

At step 520, the received data packet is an IP Multicast data packet. Thus, a buffer must be allocated from the Multicast pool 204. The pool counter logic 302 determines if there is a buffer available in the Multicast pool 204. A buffer is available if the multicast pool count 420 is greater than zero. If so, processing continues with step 522. If not, processing continues with step 518.

At step 522, the pool counter logic 302 updates the number of buffers available in the multicast pool 204 by decrementing the multicast free counter 416 through increment-decrement multicast 410. Processing continues with step 524.

At step 524, the pool counter logic 302 sets multicast tag 310 to indicate that the buffer is to be allocated for an IP Multicast data packet. The multicast tag 310 is stored with the pointer to the allocated buffer in shared memory 108 stored in an egress port queue (not shown) associated with each egress port 112 to which the IP Multicast data packet is to be forwarded. Processing continues with step 526.

At step 526, a buffer is available for allocation. The pool counter logic 302 indicates that a buffer is available for storing the received data packet through buffer_available 308. Processing is complete.

Figure 6:
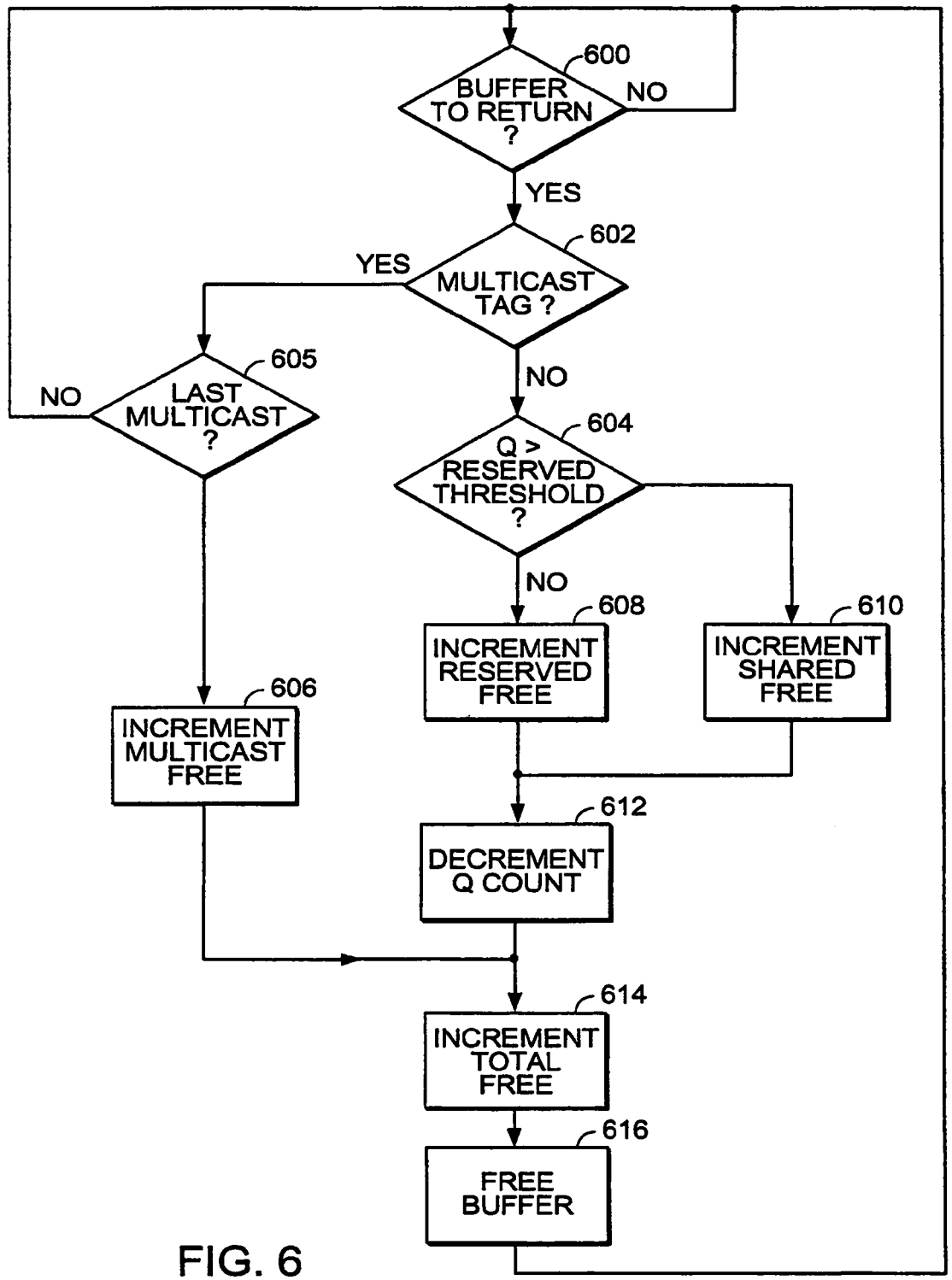
FIG. 6 is a flowchart illustrating the steps for returning a buffer to a pool implemented in pool counter logic shown in FIG. 3.

FIG. 6 is a flowchart illustrating the steps for returning a buffer to a pool implemented in the pool counter logic 302 shown in FIG. 3.

At step 600, the pool counter logic 302 waits for notification of a buffer to be returned to shared memory 108 from the egress ports engine 110. The egress ports engine 110 schedules the forwarding of a stored data packet to an egress port 112 through select 120 forwarded to the packet storage manager 106. The egress ports engine 110 includes an egress port queue (not shown) for each egress port 112. The egress port queue stores pointers to allocated buffers in shared memory 108. After the egress ports engine 110 has forwarded the data packet, the buffer can be freed. If the buffer is to be freed, processing continues with step 602. If not, processing continues with step 602.

At step 602, the multicast tag 126 stored with the pointer of the buffer to be freed indicates whether the buffer was allocated from the multicast pool 204. If the buffer was allocated from the multicast pool, processing continues with step 605. If not, processing continues with step 604.

At step 604, the pool counter logic 302 determines if the buffer is to be returned to the shared pool 200 or to a port reserve pool 202. The pool counter logic 302 examines the reserved queue count 434 associated with the egress port 112 to which the data packet was forwarded. If the respective reserved queue count 434 is greater than the reserved threshold 418, the buffer is to be returned to the shared pool 200 and processing continues with step 610. If the respective reserved queue count is less than the reserved threshold 418, the buffer is to be returned to the respective port reserve pool 202 and processing continues with step 608.

At step 605, the pool counter logic 302 determines if a copy of the IP Multicast packet has been forwarded to all members of the IP Multicast group. The IP Multicast data packet received at the ingress port 102 (FIG. 1) is stored in shared memory 108 (FIG. 1) until the IP Multicast data packet has been forwarded to all members of the IP Multicast group. After the last IP Multicast data packet has been forwarded, the buffer in shared memory 106 storing the IP Multicast data packet can be returned to the IP Multicast pool 204.

To determine if a copy of the IP Multicast data packet has been forwarded to all members of the IP Multicast group, the number of port queues (not shown) that the IP Multicast data packet has been queued on is stored in a port queue counter register (not shown). The counter register is decremented each time a copy of the IP Multicast data packet is forwarded to the egress port 110 (FIG. 1). The number of port queues is determined from the forward vector 114.

If a copy of the IP Multicast data packet has been forwarded to all members of the IP Multicast group, processing continues with step 606. If not, processing continues with step 600.

At step 606, the pool counter logic 302 updates the number of buffers available in the multicast pool 204 by incrementing the multicast free counter 416 through increment-decrement multicast 410. Processing continues with step 614.

At step 608, the pool counter logic 302 updates the number of buffers used in the port reserve pools 202 by incrementing the reserved free counter 428 through increment-decrement reserved 436. Processing continues with step 612.

At step 610, the pool counter logic 302 updates the number of buffers available in the shared pool 200 by incrementing the shared free counter 400 through increment-decrement shared 422. Processing continues with step 612.

At step 612, the pool counter logic 302 updates the number of buffers used by the egress port by decrementing the respective port reserve pool counter 414 through increment-decrement queue 426. The respective port reserve pool counter 414 is selected dependent on the state of select forwarded from the egress ports engine 110. Processing continues with step 614.

At step 614, the pool counter logic 302 updates the total number of buffers available in shared memory 108 by incrementing the total free counter 402 through increment-decrement total 404. Processing continues with step 616.

At step 616, the buffer is freed by adding a pointer to the buffer to a free list. Processing is complete.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
   logically portioning a shared memory into a number of reserved pools and other pools, the other pools including a multicast pool for storing only multicast data packets to be forwarded to at least one egress port to members of a multicast group;
   receiving a number of buffer pool selection determinants, said selection determinants including counter status information and egress port forwarding information, said egress port forwarding information dependent upon a header of an accepted data packet to be stored in a buffer;
   selecting either one of the reserved pools or one of the other pools from which to allocate the buffer for data based on said selection determinants, and said egress port forwarding information having consequence on the selecting of the pool when the selecting is from the reserved pools; and
   allocating the buffer from the selected pool.

2. The method as claimed in claim 1 wherein the egress port forwarding information includes a forward vector indicating which egress port to forward a data packet.

3. The method as claimed in claim 1 wherein the counter status information includes at least one of the following: total free counter, multicast free counter, shared free counter, reserved free counter, a plurality of port reserve pool counters, and at least one queue reserved threshold counter.

4. The method as claimed in claim 1 further comprising: determining how shared memory is divided to reduce the probability of dropping data packets.

5. A switch comprising:
   a plurality of egress ports;
   a shared memory configured to be logically portioned into reserved pools of buffers and other pools of buffers, and each one of the reserved pools of buffers being reserved for a respective one of the egress ports, and the other pools of buffers including a multicast pool of buffers reserved to store only multicast packets to be forwarded to an at least one of the egress ports to members of a multicast group;
   an information receiver for receiving a number of buffer pool selection determinants, said selection determinants including counter status information and egress port forwarding information, said egress port forwarding information dependent upon a header of an accepted data packet to be stored in a buffer; and
   logic for selecting either one of the reserved pools or one of the other pools from which to allocate the buffer for data based on said selection determinants, and said egress port forwarding information having consequence on the selecting of the pool when the logic selects from the reserved pools.

6. The switch as claimed in claim 5 wherein the egress port forwarding information includes a forward vector indicating which egress port to forward a data packet.

7. The switch as claimed in claim 5 wherein the counter status information includes at least one of the following: total free counter, multicast free counter, shared free counter, reserved free counter, a plurality of port reserve pool counters, and at least one queue reserved threshold counter.

8. The switch as claimed in claim 5 further comprising a plurality of ingress ports.

* * * * *